Jan. 12, 1965   F. T. BARRETT   3,165,334
SHOE SCRAPER FOR AUTOMOBILES AND THE LIKE
Filed April 1, 1963
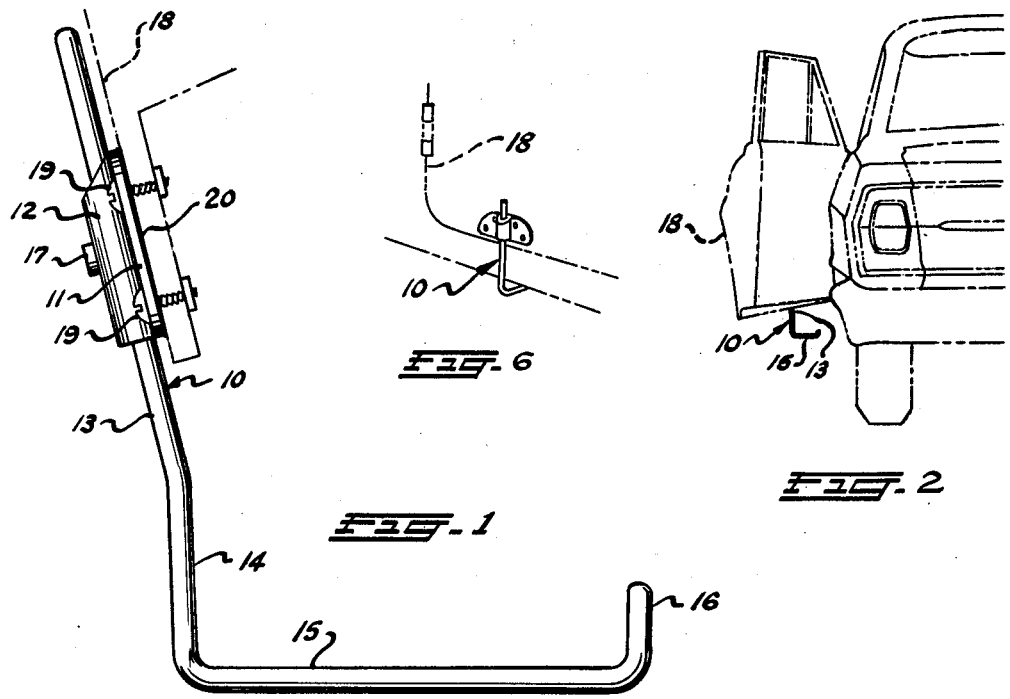
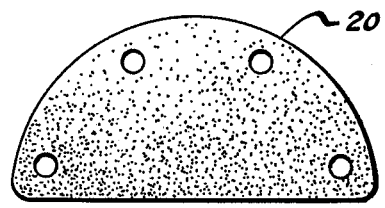
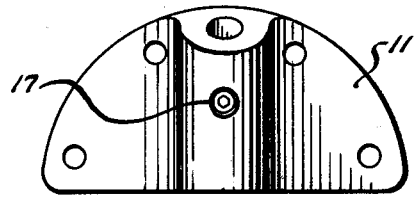
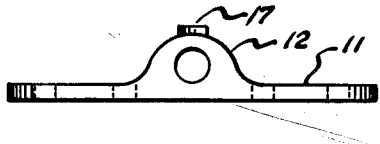
INVENTOR
FRANCIS T. BARRETT

United States Patent Office 3,165,334
Patented Jan. 12, 1965

1

3,165,334
SHOE SCRAPER FOR AUTOMOBILES
AND THE LIKE
Francis T. Barrett, Rte. 1, Box 165, Pocahontas, Iowa
Filed Apr. 1, 1963, Ser. No. 269,272
5 Claims. (Cl. 280—164)

This invention relates to automotive accessories and, more particularly, to an accessory adapted to the cleanness of the interior of the car and longer life of its mats and rugs.

This invention also increases the safety of both the occupants of any automobile on which it is placed as well as the safety of anyone who may be in the vehicle's path. Unfortunately, there are few, if any, statistics on the number of accidents or their seriousness that are caused by one tracking mud into an automobile, mud that can cause one to slip and fall with disastrous results when entering or leaving the car or that can cause one's foot to slip on the accelerator or off the brake pedal with serious damage to the vehicle as well as to other property which the car may strike.

It is, therefore, the object of this invention to provide a shoe scraper for automobiles and the like that will permit one to scrape the mud and the like off his shoes before entering the car.

Another object of this invention is to provide a shoe scraper for automobiles and the like that can readily be attached to the bottom of the door of any make or model of automobile.

Another object of this invention is to provide a shoe scraper that will not interfere with the shutting of the automobile door.

Another object of this invention is to provide a shoe scraper for automobiles and the like that is of rugged construction and will therefore not be damaged if struck by a stone thrown upward by a wheel of the car to which it is attached or by striking any obstruction against which the vehicle may be parked.

Still another object of this invention is to provide a shoe scraper that can be attached to the door of an airplane, house trailer, or the like with equal ease.

Still another object of this invention is to provide a shoe scraper for automobiles and the like that can be attached to the door in a manner that will prevent the device from accidentally falling off.

Other and further objects and advantages of this shoe scraper will be hereinafter described, and the novel features thereof defined in the appended claims.

Referring to the drawing:

FIGURE 1 is a side view of this invention attached to the door of an automobile. The portion of the door is shown in phantom lines.

FIGURE 2 is a front view of a portion of a typical automobile with one door open and this invention secured to the bottom of the same. Only the invention is shown in solid lines.

FIGURE 3 is the fiber gasket portion of this invention.

FIGURE 4 is a front view of the bracket portion of this invention.

FIGURE 5 is a top view of FIGURE 4.

FIGURE 6 is a pictorial view of the lower portion of inside of a typical automobile door with this invention secured to the same. The door is shown in phantom lines.

Similar reference characters refer to similar parts throughout the several views of the drawing.

Having reference now to the drawing in detail, there is generally indicated by the character 10 a shoe scraper for automobiles and the like comprising a bracket 11 that has the shape of a half-circle when viewed from the front, and which also has a scraper rod support housing 12 formed as an integral part of the aforesaid bracket 11.

2

The scraper rod support housing is centrally located as well as vertically disposed for the reception of the nearly vertical portion 13 of the scraper rod 14, which is slightly bent to fit the slant of the automobile door to which it is attached. The aforesaid scraper rod 14 has its lower end terminating in a horizontally formed member 15 that has its outer end terminating in an upturned portion 16. The scraper rod 14 is held in place in the scraper support rod housing 12 by means of a set screw 17 when the device is secured to the lower inside portion of an automobile door 18 by means of a plurality of screws 19. A gasket 20 which is made from any desired material is placed between the flat side of the bracket 11 and the door 18 of the car, as one can see on looking closely at FIGURE 1 of the attached drawing.

This unique invention of a shoe scraper for automobiles and the like can, of course, be modified in shape in order to adapt the same to the different door contours of automobiles, airplanes, or to whatever it is attached. The device can be manufactured from steel, aluminum, or any other suitable material. The actual method of attaching the device to the door of a vehicle is also subject to change with each installation, and it will still be in keeping with the scope of the appended claims.

Having now described my invention, what is claimed and desired to secure by Letters Patent is:

1. A shoe scraper for automobiles and the like comprising, a vertically disposed scraper rod having an upper portion to fit in an upright position along the lower outer portion of an automobile door, and a horizontally disposed lower portion on which one scrapes his shoes on entering an automobile, means for securing the said upper portion of the said scraper rod to the lower outer surface of the door of an automobile or the like in vertically adjusted position with the lower portion extending under the door substantially perpendicular to the outer surface of the door.

2. A shoe scraper for automobiles and the like comprising, a vertically disposed scraper rod having an upper portion slightly bent to fit in an upright position along the lower outer portion of an automobile door, and a horizontally disposed lower portion on which one scrapes his shoes on entering an automobile, means for securing the said slightly bent upper portion of the said scraper rod to the lower outer surface of the door of an automobile or the like in vertically adjusted position with the lower portion extending under the door substantially perpendicular to the outer surface of the door.

3. A shoe scraper for automobiles and the like comprising a vertically disposed scraper rod having an upper portion slightly bent to fit in an upright position along the lower outer portion of an automobile door, and a horizontally disposed lower portion on which one scrapes his shoes on entering an automobile, means for securing the said slightly bent upper portion of the said scraper rod to the lower portion of the door of an automobile or the like in vertically adjusted position with the lower portion extending under the door substantially perpendicular to the outer surface of the door by means of a bracket having the shape of a half-circle when viewed from the front, the said bracket being securable to the door of an automobile by means of a plurality of screws.

4. A shoe scraper for automobiles and the like comprising a vertically disposed scraper rod having an upper portion slightly bent to fit in an upright position along the lower outer portion of an automobile door, and a horizontally disposed lower portion on which one scrapes his shoes on entering an automobile, means for securing the said slightly bent upper portion of the said scraper rod to the lower portion of the door of an automobile or the like in vertically adjusted position with the lower portion extending under the door substantially perpendicular to the outer surface of the door by means of a bracket having the shape of a half-circle when viewed from the front, the said bracket having a centrally located substantially vertical bore, through which the said slightly bent upper portion of the said scraper rod projects and is secured by means of a set screw, the said bracket being secured to the door of an automobile by means of a plurality of screws.

5. A shoe scraper for automobiles and the like comprising a vertically disposed scraper rod having an upper portion slightly bent to fit in an upright position along the lower outer portion of an automobile door, and a horizontally disposed lower portion on which one scrapes his shoes on entering an automobile, means for securing the said slightly bent upper portion of the said scraper rod to the lower portion of the door of an automobile or the like in vertically adjusted position with the lower portion extending under the door substantially perpendicular to the outer surface of the door by means of a bracket having the shape of a half-circle when viewed from the front, the said bracket having a centrally located substantially vertical bore, through which the said slightly bent upper portion of the said scraper rod projects and is securable by means of a set screw, the said bracket being secured to the door of an automobile by means of a plurality of screws and a gasket securable between the said bracket and the said door of the said automobile by the said plurality of screws.

References Cited by the Examiner

UNITED STATES PATENTS

| | | | |
|---|---|---|---|
| 2,665,921 | 1/54 | Schetzer | 280—164 |
| 2,677,553 | 5/54 | Miller | 280—164 |
| 2,933,750 | 4/60 | Scott | 15—237 |
| 2,979,340 | 4/61 | Morrissey | 280—164 |
| 3,097,388 | 7/63 | Gresko | 15—237 |

PHILIP ARNOLD, *Primary Examiner.*

LEO FRIAGLIA, *Examiner.*